United States Patent
Richarte et al.

(10) Patent No.: US 10,412,325 B2
(45) Date of Patent: Sep. 10, 2019

(54) FOCUS PLANE EQUALIZER APPARATUS WITH PRISMATIC FOCUS CORRECTOR

(71) Applicant: Urugus S.A.

(72) Inventors: Gerardo Gabriel Richarte, Caba (AR); Agustina Pose, Caba (AR); David Vilaseca, Caba (AR); Pablo Jais, Caba (AR); Juan Manuel Vuletich, Provincia de BsAs (AR)

(73) Assignee: Urugus S.A., Montevideo (UY)

(*) Notice: Subject to any disclaimer, the term of this patent is extended or adjusted under 35 U.S.C. 154(b) by 0 days.

(21) Appl. No.: 15/706,367

(22) Filed: Sep. 15, 2017

(65) Prior Publication Data

US 2019/0089914 A1    Mar. 21, 2019

(51) Int. Cl.

| | |
|---|---|
| *H04N 5/33* | (2006.01) |
| *G02B 5/20* | (2006.01) |
| *G01J 3/28* | (2006.01) |
| *G01J 3/10* | (2006.01) |
| *G01J 3/02* | (2006.01) |
| *G06T 1/00* | (2006.01) |
| *G01J 3/51* | (2006.01) |

(52) U.S. Cl.
CPC ............ *H04N 5/332* (2013.01); *G01J 3/0237* (2013.01); *G01J 3/108* (2013.01); *G01J 3/2803* (2013.01); *G01J 3/2823* (2013.01); *G01J 3/51* (2013.01); *G02B 5/204* (2013.01); *G02B 5/208* (2013.01); *G06T 1/0007* (2013.01); *G01J 2003/2826* (2013.01); *G06T 2207/10036* (2013.01); *G06T 2207/10048* (2013.01); *G06T 2207/10148* (2013.01)

(58) Field of Classification Search
CPC ... G02B 5/00; G02B 5/02; G02B 5/04; G02B 5/18; G02B 5/1828; G02B 5/1861; G02B 5/1866; G02B 5/1876; G02B 5/189
See application file for complete search history.

(56) References Cited

U.S. PATENT DOCUMENTS

| | | | | |
|---|---|---|---|---|
| 4,435,041 A | * | 3/1984 | Torok | G02B 5/1828 359/573 |
| 5,784,191 A | * | 7/1998 | Wood | G02F 1/3511 359/285 |
| 6,266,191 B1 | * | 7/2001 | Abe | G02B 27/0037 359/565 |
| 6,285,507 B1 | * | 9/2001 | Sakamoto | G02B 13/24 359/642 |

(Continued)

OTHER PUBLICATIONS

The PCT Search Report and Written Opinion dated Oct. 11, 2018, for the PCT Application No. PCT/US18/51193, 9 pages.

*Primary Examiner* — Yara B Green
(74) *Attorney, Agent, or Firm* — Lee & Hayes, P.C.

(57) ABSTRACT

Systems and methods for hyperspectral and multispectral imaging are disclosed. A system includes a lens and an imaging device having a plurality of pixel sensors. A focus corrector is located within the optical path to refract at least a portion of the incoming light and change the focusing distance of specific wavelengths of light to converge at a focal plane. The focal corrector is selected based upon the imaging system to reduce an overall measure of deviation between a focal length curve for the lens and a focus position curve for pixel sensors to produce focused imaging data for a broad spectrum of light, including beyond the visible range.

19 Claims, 8 Drawing Sheets

(56) References Cited

U.S. PATENT DOCUMENTS

| | | | |
|---|---|---|---|
| 6,552,788 B1* | 4/2003 | Castle | G01J 3/2823 356/305 |
| 2010/0110233 A1* | 5/2010 | Ohara | G02B 5/00 348/240.3 |
| 2011/0002505 A1* | 1/2011 | Barrow | G02B 27/1013 382/103 |

* cited by examiner

FOCUS PLANE EQUALIZER APPARATUS WITH PRISMATIC FOCUS CORRECTOR

BACKGROUND

All optical lenses present some degree of longitudinal chromatic aberration, meaning that the focusing distance for a given lens is at least slightly different for different wavelengths of light. In imaging systems, this means that the image produced is either in-focus or out-of-focus depending on the wavelength or wavelengths of the incoming light. Additionally, some portions of the image may be in-focus while other portions of the image may be out of focus. Also, the image may be geometrically deformed to some degree due to the differences in focal lengths of different wavelengths. These problems become exacerbated as images include a broader spectrum of wavelengths.

For a simple lens, there may be only a single wavelength for which the lens is in-focus at a given focal distance. Lenses with some amount of chromatic correction, such as achromatic lenses, apochromatic lenses, and superachromatic lenses, are designed to reduce the focusing error (e.g., the differences between the focal lengths of the wavelengths for the lens), in a certain spectrum around the desired wavelengths. These chromatically corrected lenses reduce the focusing error in a certain band of desired wavelengths, such as in the visible spectrum. Broad-spectrum lenses—those that correct for focal lengths outside of the visible spectrum—are complicated, heavy, and expensive.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Embodiments include an imaging system, such as an aerial or satellite-based imaging system, having a sensor array (e.g., an array of pixel sensors) configured to capture multispectral, or hyperspectral images. A focus corrector is disposed within the optical path of the sensor to correct the chromatic aberration inherent with multispectral imaging. Imaging systems according to embodiments may include imaging spectrometers, variable filters, or other mechanisms that cause the pixel sensors within portions of the imaging array to be associated with a narrow band of wavelengths. Thus, the wavelength associated with a pixel sensor is a function of the pixel sensor's position on the imaging array. A focus corrector, which may be prismatic, stepped, curved, a combination of the above, or any other configuration may be used to correct the chromatic aberration resulting from different wavelengths of light having a different focusing distance. That is, the focus corrector changes the focal length of the desired wavelengths to within a threshold focus error tolerance. The desired wavelengths that are affected by the focus corrector may include a continuous spectral range, or discrete portions of the spectral range, or in some cases, may include very narrow and specific wavelengths or ranges of wavelengths. In many embodiments, the focus corrector is designed to cause the focal lengths of the wavelengths of interest to be equal within a predetermined threshold focus error tolerance. The sensor array is preferably located at the corrected focal length to result in a focused hyperspectral or multispectral image.

Introducing a focus corrector may result in image distortions. These distortions are correctable using image processing. An imaging system that utilizes a focus corrector and image processing to correct distortions is able to achieve suitable image quality in a multispectral or hyperspectral imaging system, including in a satellite or airborne imaging system, while being less expensive than using a lens with chromatic correction to achieve focal length correction.

Various examples are described herein to aid in illustration, although those examples are not meant to be taken in a limiting sense.

Example Imaging Devices

Figure 1:
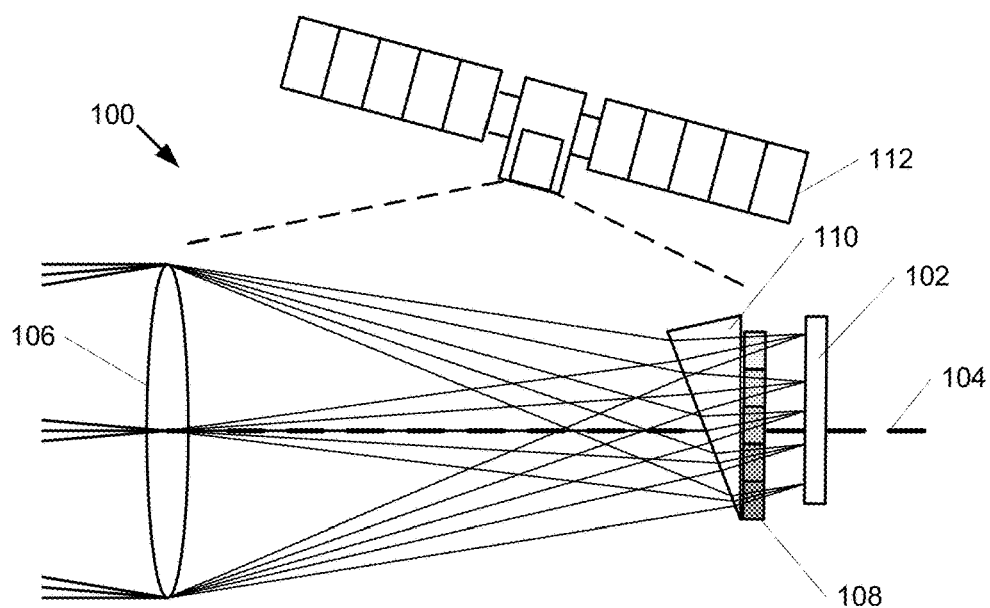
FIG. 1 illustrates a side view of an example imaging device having a sensor array with a prismatic corrector.

FIG. 1 illustrates a side view of an example imaging device 100 having a sensor array 102 aligned substantially perpendicular with respect to an optical axis 104 of a lens 106. The sensor array 102 includes a plurality of pixel sensors arranged in a planar area that coincides with the optical axis 104 of the lens 106 and is substantially perpendicular to the optical axis 104 of the lens 106. An optical bandpass filter 108 is disposed in the optical path of the sensor array 102 and may be used to filter the incoming light. A focus corrector 110 is located in the optical path of the sensor array 102 and may be located before the optical bandpass filter 108. The focus corrector 110 may be a prism, as shown, in which one surface of the focus corrector 110 is angled with respect to an opposing surface of the focus corrector 110 such that light passing through the focus corrector is refracted. Light enters the lens 106 (from the left side of the FIG. 1) and passes through to focus corrector 110, which refracts the incoming light. The light exiting the focus corrector 110 passes through the optical bandpass filter 108, and reaches the sensor array 102. As illustrated, the focus corrector 110 refracts the light such that the imaging sensor may be positioned such that the refracted light substantially converges onto the imaging sensor 102. That is, the wavelengths of light are refracted such that they are focused onto the sensor array 102 within a predetermined focus threshold. In some instances, a center point of the imaging sensor 102 may not align with the optical axis of the lens.

The imaging device 100 may be part of a moveable imaging platform, such as an aerial or satellite imaging system, such as part of a satellite 112 as illustrated in FIG. 1. The imaging device 100 may likewise be part of a ground-based or other imaging system. In some instances, the imaging platform is not designed to move during image capture, while in other implementations, the imaging platform is in motion during image capture.

Figure 2A:
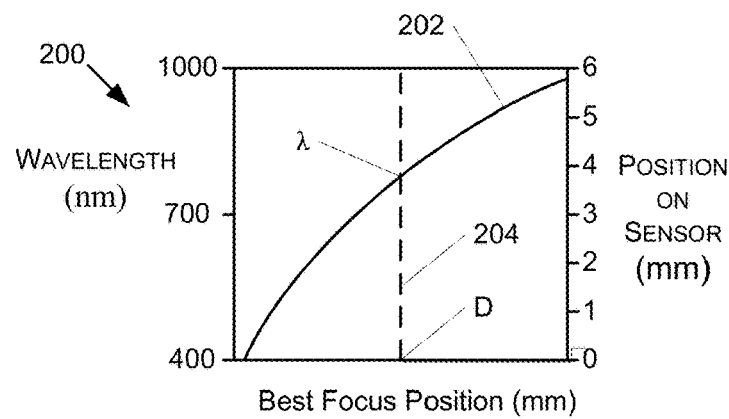
FIGS. 2A-B illustrate graphs of focal lengths plotted against wavelengths for a sensor array without a prismatic corrector, and with a prismatic corrector, respectively.
Figure 2B:
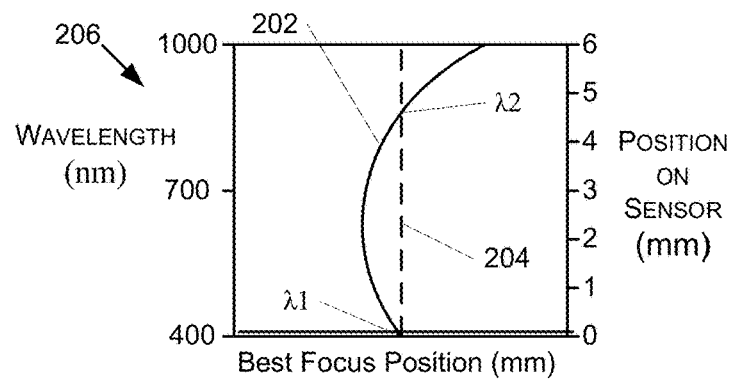

FIGS. 2A-B illustrates graphs of focal lengths plotted against wavelengths for a sensor array 102 without a focus corrector 110, and with a focus corrector 110, respectively. Graph 200 plots a focal length curve 202 of focal lengths of a range of wavelengths (in this case running from 400 nanometers to 1000 nanometers) for the lens 106 with respect to the sensor array 102 without the focus corrector.

A focus position curve 204 charts the distance of portions of the sensor array from the lens 106. The pixel sensors on the sensor array 102 are arranged in a planar area, and the focus position curve 204 is a straight line. The focus position curve 204 is therefore a straight line that runs straight up the graph 200. In the example illustrated in FIG. 2A, all portions of the sensor array are at the same distance D from the lens 106, and in many implementations of imaging systems, this distance D is selected to coincide with a specific wavelength of light in the visible spectrum.

In the graph 200, the position of a portion of the sensor array (plotted on the right side of graph 200) is associated with a narrow band of wavelength(s) of light (plotted on the left side of graph 200). For example, the pixel sensors in the sensor array 102 are distributed such that those configured to detect wavelengths at approximately 700 nm are positioned approximately 3.1 millimeters from an edge of the sensor array. Sensors configured to detect (or that are otherwise associated with) other wavelengths of light are positioned at different locations in the sensor array. In the example illustrated in FIG. 2A, only wavelength $\lambda$ is in focus. And the deviations of the focal length curve 202 from the focus position curve 204 are relatively large for wavelengths other than wavelength $\lambda$. This means that the image quality of images captured using the lens 106 and a sensor array may suffer from image distortions and lack of focus. In other words, most lenses fail to focus all colors of light to the same convergence point. This is a result of lenses having different refractive indices for different wavelengths of light. This phenomenon is referred to as chromatic aberration. The phenomenon is exacerbated when capturing multispectral or hyperspectral images because the captured wavelengths represent a broad spectrum in comparison to the relatively narrow visible light spectrum.

Graph 206 of FIG. 2B includes the focal length curve 202 for the sensor array 102 with the addition of a focus corrector 110 and an optical bandpass filter 108. In some embodiments, a non-linear variable filter can be used to further reduce the focusing error. The focus position curve 204 represents the distance of portions of the sensor array 102 from the lens 106 as in the previous figure. In the example illustrated in FIG. 2B, an overall measure of deviation of focal length curve 202 (e.g., the curve of corresponding focal lengths of the lens for the ones of the plurality of wavelengths) from focus position curve 204 (e.g., the curve of distances of the ones of the plurality of pixel sensors to the lens) is much reduced compared with the deviation of focal length curve 202 from focus position curve 204 in FIG. 2A. This is because the focus corrector 110 refracts the incoming light to converge to a point that is much closer to the sensor array. As illustrated in FIG. 2B, there are two wavelengths, $\lambda 1$ and $\lambda 2$, that are in focus, and other wavelengths within the range of wavelengths shown in FIG. 2B are overall much closer to being in focus than are the wavelengths in FIG. 2A.

The focus corrector 110 may be designed for each optical system to correct for chromatic aberration specific to a particular optical system. In addition, where a focus corrector 110 is prismatic, as shown in FIG. 1, the resulting image may be stretched along the prism direction as a result of the light refraction, which may be accounted for and corrected during post processing of the image through any suitable technique.

In the example imaging device 100 illustrated in FIG. 1, there is an arrangement of pixel sensors in the sensor array 102, such that the wavelength(s) that the pixel sensors are configured to detect (plotted on the left side of the sensor array) match to the position on the sensor (plotted on the right side of graph 206) in a linear fashion across the sensor array. In other words, there is a linear relationship between position on the sensor array 102 and the wavelength of light that the pixel sensor is configured to detect. An optical bandpass filter 108 further enhances this relationship. A non-linear arrangement of pixel sensors may be used in some embodiments, such that the wavelength(s) that the pixel sensors are configured to detect match to the position on the sensor in a non-linear fashion, which would result in a different focal length curve for the lens 106. A corresponding focus corrector 110 may be designed and implemented based up the inherent focal length curve for the optical system.

Imaging systems according to embodiments of the present disclosure may include one or more optical bandpass filters 108, placed between the sensor array (such as the sensor array 102) and the lens 106. Such filters 108 may include variable filters, including linear variable filters and non-linear variable filters, and other types of filters. The filters 108 may alternatively be placed between the sensor array 102 and the focus corrector 110, or may be placed between the focus corrector 110 and the lens 106, depending on the optical system and the desired focusing characteristics.

Figure 3:
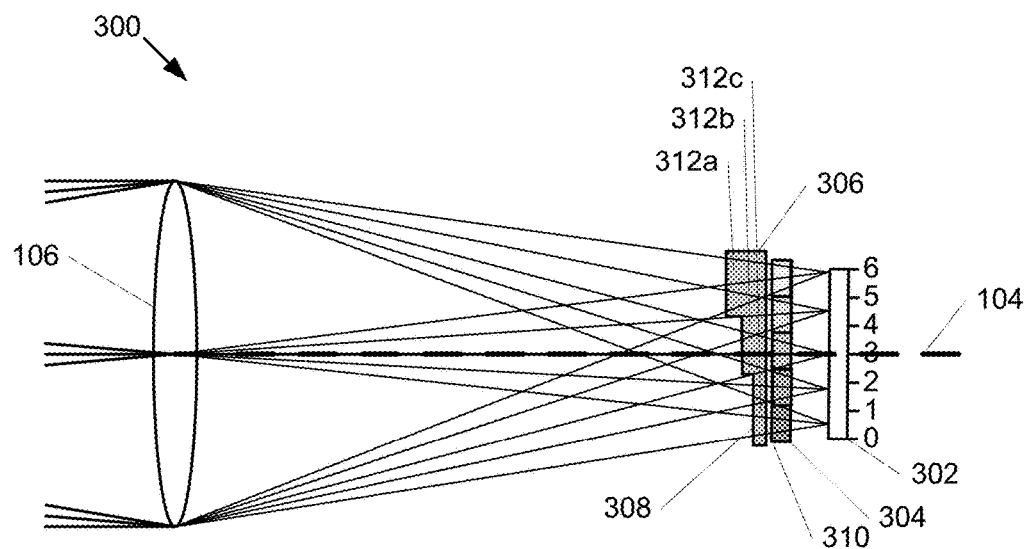
FIG. 3 illustrates a side view of an example imaging device having a sensor array and a stepped focus corrector and discrete filter.

FIG. 3 illustrates a side view of an example imaging device 300 having a sensor array 302 and an optical bandpass filter 304 aligned substantially perpendicular with respect to an optical axis 104 of a lens 106. The sensor array 302 may be the same as or similar to the sensor array 102 of FIG. 1, although they may be different. Different portions of the optical bandpass filter 304 along its length filter out all but certain wavelengths. The presence of the optical bandpass filter 304 associates portions of the sensor array 302 with different wavelengths. The optical bandpass filter 304 may be a discrete filter, in which there are contiguous areas of the filter with the same transmitted wavelength and the transitions between the areas are abrupt. In other instances, the optical bandpass filter 304 may be a variable bandpass filter, in which transitions between areas that allow various wavelengths to pass are gradual.

As illustrated, a focus corrector 306 may be located between the lens 106 and the optical bandpass filter 304. The focus corrector 306 may be stepped, that is, may have areas of constant thickness, where one area has a larger thickness than another area. For example, a first area 312a may have a thickness that is greater than a second area 312b, which in turn has a greater thickness than a third area 312c. In this instance, a first face 308 of the focus corrector 306 may be parallel to a second face 310 of the focus corrector 306. In some embodiments, the first face 308 may be slightly skewed with respect to the second face 310, which may alleviate some ghosting effects that can be caused by light reflecting off the lens elements before it reaches the sensor array 302.

With the stepped focus corrector 306 illustrated in FIG. 3, each area 312a, 312b, and 312c of the focus corrector 306 may magnify the image by a different factor as a result of the different thickness at each area. This can be corrected during post-processing by scaling each sub-image appropriately. For instance, the captured image may be divided into sub-images that represent portions of the overall image that were captured through each area of the focus corrector. Each of these sub-images can then be scaled by a scaling factor to correct for the different levels of magnification of the sub-images.

The different thicknesses of each area 312a, 312b, 312c, will also present different transition areas due to the increased distance to the sensor along the optical axis 104, thereby slightly distorting the resulting image. However, this distortion can likewise be corrected for during post-processing. While the illustrated example shows three discrete stepped portions of the focus corrector, it should be appreciated that more, or fewer, stepped portions are contemplated herein and can be implemented based upon performance factors, and other factors, as the situation determines.

Figure 4:
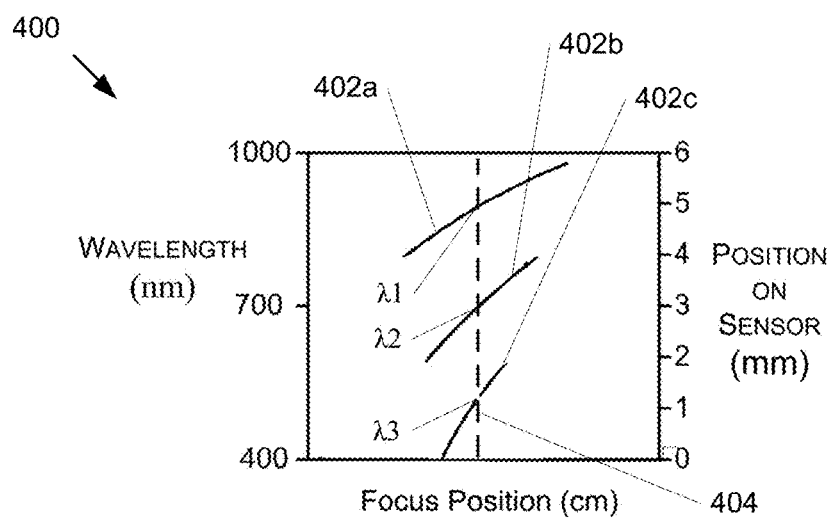
FIG. 4 illustrates a graph of focal lengths plotted against wavelengths for a sensor array with a stepped prismatic focus corrector.

FIG. 4 illustrates a graph 400 of focal lengths plotted against wavelengths when a stepped focus corrector 306 is employed. The example graph 400 illustrated in FIG. 4 is similar to the graph 206 illustrated in FIG. 2B. Focal length curves 402a, 402b, and 402c charts the focal lengths of a plurality of wavelengths for the lens 106, and generally correspond to each area 312a, 312b, and 312c of the stepped focus corrector. A focus position curve 404 charts the distance of portions of the sensor array 302 from the lens 106. The incorporation of the stepped focus corrector 306 causes the light passing therethrough to be refracted and focused at a location that is much close to the sensor array 302 than without the focus corrector 306. In other words, in the example illustrated in FIG. 4, an overall measure of deviation of the focal length curves 402a, 402b, and 402c from each stepped area 312a, 312b, and 312c of the focus corrector 402 from the focus position curve 404 is reduced compared with a system that does not employ the focus corrector 306. In this particular example, there are three wavelengths λ1, λ2, and λ3 that are in focus, and other wavelengths within the range shown in FIG. 4 are overall closer to being in focus compared with the wavelengths in FIG. 2A (for example).

Figure 5:
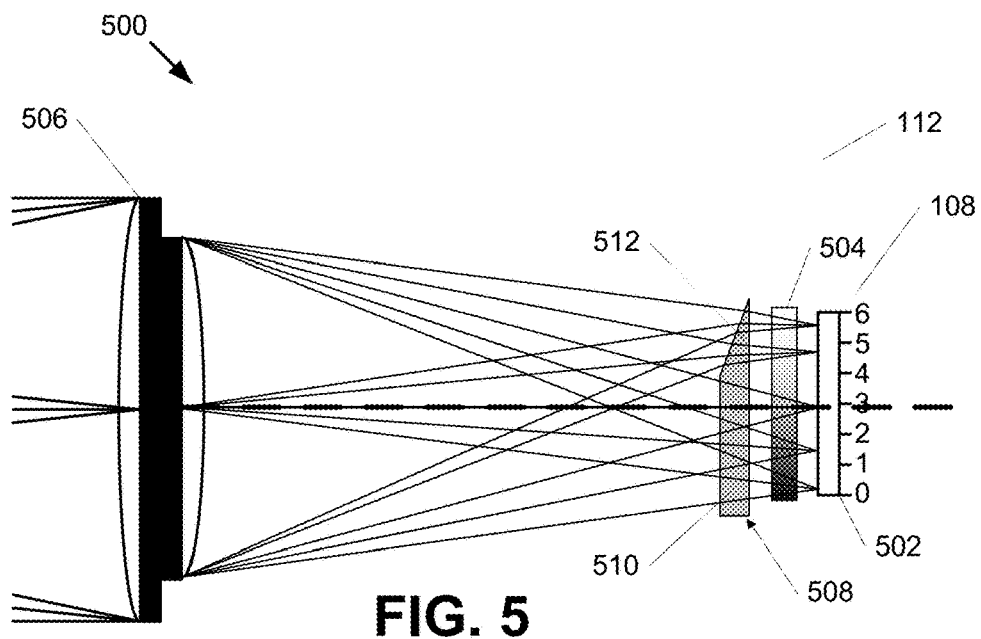
FIG. 5 illustrates a side view of an example imaging device having a sensor array and a focal corrector disposed within the optical path of the sensor array.

FIG. 5 illustrates a side view of an example imaging device 500 having a sensor array 502 and a linear variable filter 504. The sensor array 502 may be the same as or similar to one or both of the sensor array 102 and the sensor array 302. In some imaging devices, a lens 506 may be corrected for a fraction of the spectrum of interest. For example, there are certain lenses 506 that have been designed to correct for chromatic aberration for a specific portion of the spectrum, such as, for example, achromatic, apochromatic, or superachromatic lenses. In embodiments that utilize such a lens 506, it may be desirable to capture images having a spectrum of interest that is broader than the spectrum for which the lens 506 can correct on its own.

While portions of the image may be corrected by the lens, in which case the focusing error may be small, there may still exist portions of the image that are out of focus because they contain spectrum data that is beyond the ability of the lens to correct. Accordingly, a focus corrector 508 may be used that has two or more areas. A first constant-thickness area 510 may generally coincide with the wavelengths that are corrected by the lens, and a prismatic area 512 may be used to refract and correct the focus of the wavelengths that are not correctable by the lens. Of course, focus correctors having other geometries are possible and contemplated herein and may provide a more accurate focus correction. However, in some embodiments, a prismatic focus corrector is utilized due to its manufacturability.

As the light passes from one transparent medium to another, such as from a vacuum to the focus corrector, the light rays bend according to Snell's Law:

$$n_1 \sin \theta_1 = n_2 \sin \theta_2$$

where θ1 is the angle between the light ray and the surface normal in the first medium, θ2 is the angle between the light ray and the surface normal in the second medium, and n1 and n2 are the indices of refraction, where n=1 in a vacuum and n>1 in a transparent material.

Based upon this phenomenon, a focus corrector can be designed to refract a desired spectrum of light and cause it to converge at, or very near to, the sensor array. In some instances, the focus corrector can be configured to refract only a small portion of the wavelength range of the incoming light.

A variable filter 504 can further reduce the focusing error. In some instances, the variable filter 504 may need to be non-linear to account for the light refraction caused by the prismatic area 512 of the focus corrector 508. The presence of the non-linear variable filter 504 associates portions of the sensor array 302 with different wavelengths and can be selected based upon the focus corrector 508. The non-linear variable filter 504 provides a non-linear distribution of wavelength absorption along its length, such that a function of the wavelengths that pass through the non-linear variable filter 504 is non-linear with respect to the position on the non-linear filter 504. As a result, a function of wavelengths is also non-linear with respect to the position on the sensor array 502 associated with the wavelengths. This non-linearity may create minor distortions of the image with respect to the specific wavelengths that are captured; however, these distortions can be corrected during post processing through any suitable geometric distortion correction utility.

Figure 6A:
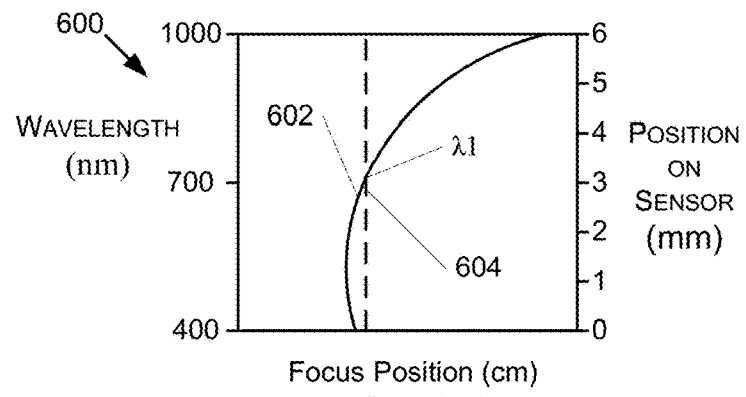
FIG. 6A-B illustrate graphs of focal lengths plotted against wavelengths for a sensor array without a focal corrector, and with a focal corrector, respectively.

FIG. 6A illustrates a graph 600 of focal lengths plotted against wavelengths when just a non-linear variable filter 504 is employed. The non-linear variable filter 504 flattens the focal length curve 602 for the lens and, as can be seen, produces a focal length curve 602 that is relatively close to the focus position curve 604 between about 400 nm and 700 nm. However, wavelengths above about 700 nm have a focal length that deviates significantly from the focus position curve 604.

Figure 6B:
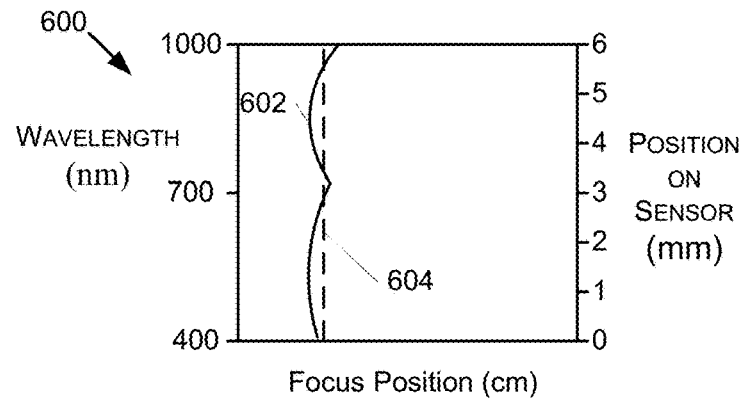

FIG. 6B illustrates a graph 600 of focal lengths plotted against wavelengths when both a non-linear variable filter 504 and a focus corrector 508 are utilized. As can be seen, the focal length curve 602 is similar to the curve of FIG. 6A from about 400 nm to about 700 nm where the light passes through the constant-thickness portion 510 of the focus corrector 508. However, above about 700 nm, where the light passes through the prismatic-portion 512 of the focus corrector 508, the focal length curve 602 only has a slight deviation from the focus position curve 604. The result is an image in which four wavelengths are in sharp focus, and the remaining wavelengths only have a slight focus deviation from the focus position curve 604.

A focus corrector 508 may be selected or designed that minimizes an overall measure of deviation between the focal length curve 602 and the focus position curve 604. The focus corrector 508 is selected based upon the imaging system, such as whether the lens has corrected for a fraction of the spectrum of interest and the spectrum of interest. The focus corrector 508 may optionally be provided with antireflex coatings to reduce or even minimize the loss of light and/or ghosting effects. Additional details of focus corrector 508 selection are provided below in relation to FIG. 10.

Figure 7:
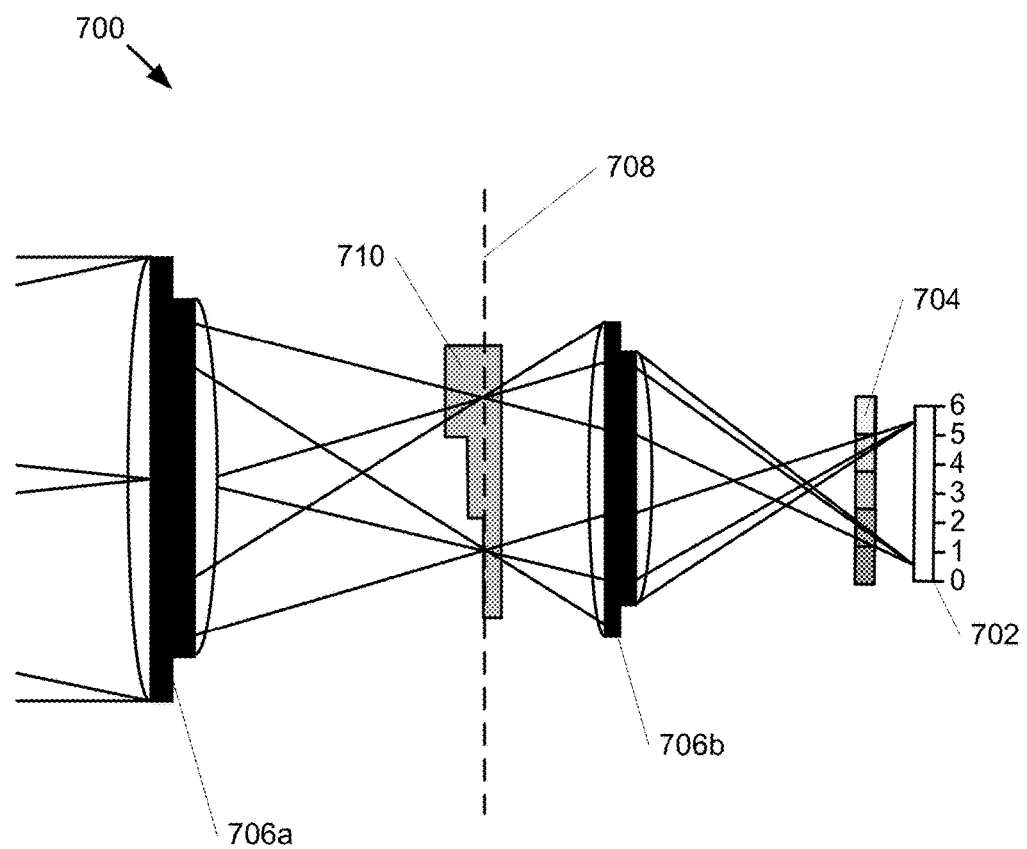
FIG. 7 illustrates a focal corrector located in a conjugate plane of an imaging sensor.

FIG. 7 illustrates a side view of an example imaging device 700 having a sensor array 702 and an optical bandpass filter 704 located adjacent to the sensor array 702. In an imaging system having sufficient optical elements 706a, 706b, a conjugate focal plane 708 (or just "conjugate plane") may exist. That is, a conjugate plane may exist apart from the focal plane at which each point at the conjugate plane is imaged at the same relative location at the focal plane. As such, a focus corrector 710 may be located coincident with the conjugate plane 708 without introducing distortion into the captured image. A further advantage of this configuration is that it reduces areas on the imaging sensor 702 that do not receive image data. In other words, locating a focus corrector 710 at a conjugate plane 708 reduces dead areas on the sensor array 702.

With any of the examples described herein, a focus corrector 710 may be implemented into any suitable imaging system. The sensor array 702 may be the same as or similar to one or more of the sensor arrays 102, 302, and 502. The sensor array 702 includes pixel sensors. The pixel sensors include, in at least some embodiments, semiconductor charged coupled devices (CCD), complementary metal-oxide-semiconductor (CMOS) active pixel sensors, N-type metal-oxide semiconductor (NMOS) technologies, and so forth. In some embodiments, all pixel sensors may correspond to a subset of a plurality of wavelengths, including for example a band of wavelengths, including a narrow band of wavelengths, including for example a single wavelength, or including two or more discontinuous wavelengths, including discontinuous bands of wavelengths. The optical bandpass filter 704 may further promote the correspondence of pixel sensors to specific wavelengths. The optical bandpass filter 704 may comprise a discrete bandpass filter in which continuous areas of the filter allow the same transmitted wavelength. Other embodiments use a variable filter, in which the transmitted wavelength varies continuously across the filter. The variable filter may either be linear, in which the transition from one wavelength to another follows a linear progression, or may be non-linear in which the transition between transmitted wavelengths is not uniform across the length of the filter. Other examples are possible without departing from the scope of embodiments.

In some embodiments the pixel sensors are designated for or otherwise correspond to a subset of plurality of wavelengths based, for example, on the pixel sensors being configured to detect the subset of wavelengths. For example, the pixel sensors may be specifically fabricated to produce an electrical signal (e.g., voltage or current change) in response to sensing or detecting an incident photon having a wavelength within the subset of wavelengths designated for the pixel sensor depending on where the pixel sensor is located within the sensor array. In these embodiments, the pixel sensors may be arranged in the planar area of the sensor array 702 such that distances that ones of the plurality of pixel sensors are from a first edge of the planar area along one dimension of the planar area is related to corresponding ones of a plurality of wavelengths that the ones of the plurality of pixel sensors are configured to detect. For example, the plurality of pixel sensors may be arranged in the planar area of the sensor array 702 such that first ones of the plurality of pixel sensors configured to detect longer ones of the plurality of wavelengths are further from the first edge of the planar area than second ones of the plurality of pixel sensors configured to detect shorter ones of the plurality of wavelengths. An example of a sensor array 702 having these characteristics is an imaging spectrometer, although other examples are possible without departing from the scope of embodiments described or claimed herein.

In some embodiments, the pixel sensors may be distributed in a way that some pixel sensors located at a particular location within the sensor array 702 are configured to detect photons having a broad spectrum of wavelengths. In some embodiments, it is the presence of a filter, such as a linear or non-linear variable filter that associates a particular portion of the sensor array 702 with a particular subset of the plurality of wavelengths.

Example Imaging System

Figure 8:
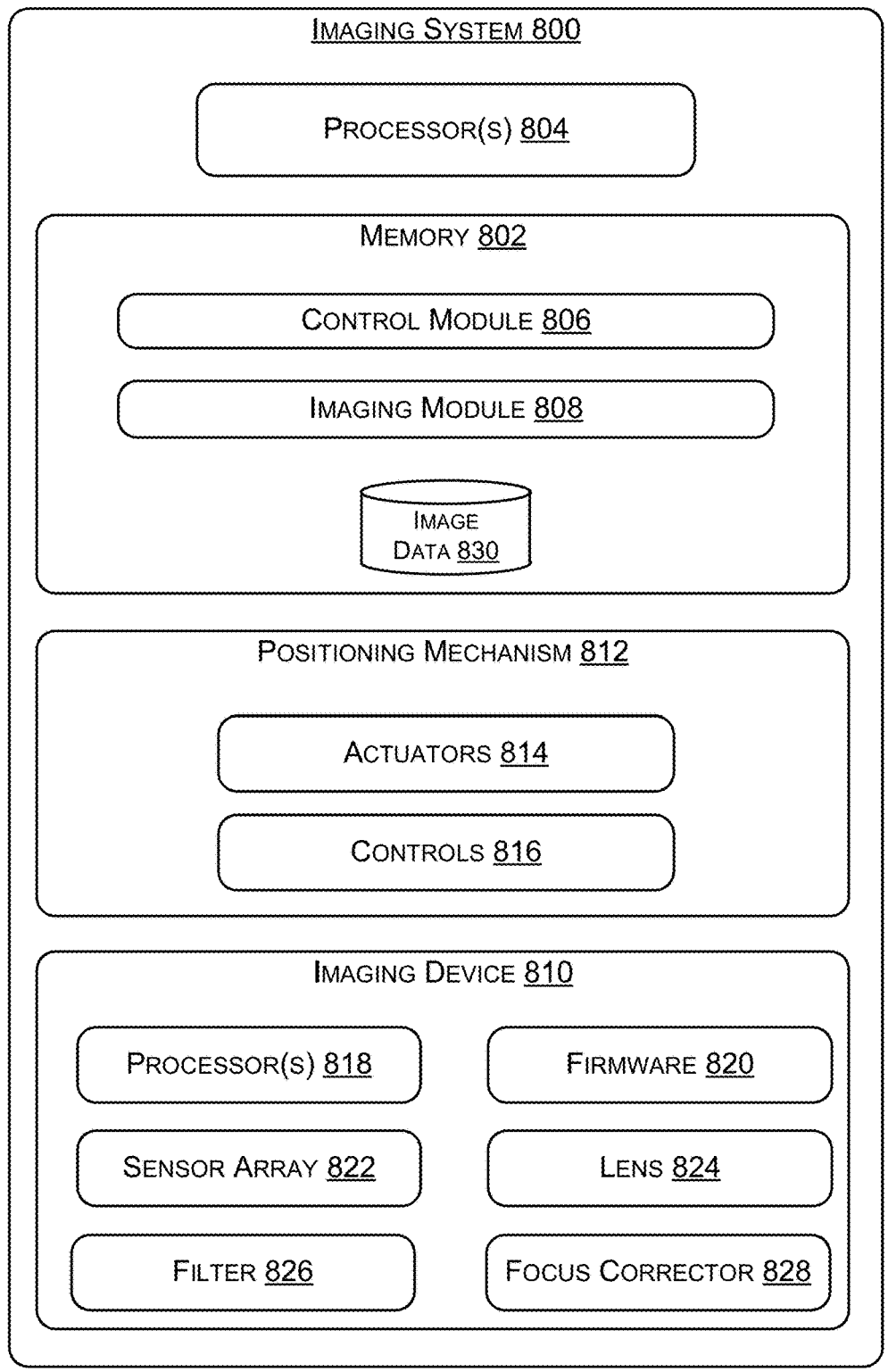
FIG. 8 is a block diagram of an example imaging system having an imaging device with a focal corrector and bandpass filter.

FIG. 8 is a block diagram of an example imaging system 800 having an imaging device with a sensor array and a focus corrector. The imaging system 800 may include a satellite imaging system. The satellite imaging system of imaging system 800 may be all or partially on-board an aircraft or spacecraft, such as the satellite 112, which may be a low-earth orbit satellite. In some embodiments, some of the components of the imaging system 800 may be ground-based or on-board a separate aircraft or spacecraft, with such ground-based or separate aircraft or spacecraft in communication with a portion of the imaging system 800 that includes the optics systems (e.g., the lens 106 and the sensor array, among other things). The imaging system 800 may be configured with any suitable computing device or system. Memory 802 may store program instructions and program modules that are loadable and executable on one or more processor(s) 804, as well as data generated during execution of, and/or usable in conjunction with, these programs, such as image data, images, and so forth.

Memory 802 includes at least a control module 806 and an imaging module 808. The control module 806 may be executable to perform control functions associated with image capture in accordance with embodiments of the present disclosure. For example, the control module 806 may be configured to control a position of an imaging device 810 such as by issuing electrical signals or commands through one or more input/output interfaces of the imaging device 810. In particular, the control module 806 may cause the orientation of the imaging device 810 to be changed via a positioning mechanism 812, which may include one or more actuators 814 and one or more controls 816. The actuators 814 may include piezoelectric actuators, which may be controlled via electrical signals provided by controls 816 to position or move the imaging device 810 before, during, or after image capture. For example, the imaging device 810 may be moved in order to point it towards a scene to be imaged. Furthermore the imaging device 810 may be rotated to align the scene to correspond with a direction of travel of the imaging system 800.

The imaging device 810 may be the same as or similar to one or more of the imaging devices 100, 300, and 500. The imaging device 810 may include one or more processors 818 and firmware 820, such as may be stored in a suitable non-transitory memory of the imaging device 810. The firmware 820 may be executable by the one or more processors 818 to perform image capture functions. The imaging device 810 includes a sensor array 822, which may be the same as or similar to one or more of the sensor array 102, the sensor array 302, the sensor array 502, and the sensor array 702. The sensor array 822 may be oriented generally perpendicular to an optical axis of a lens 824, such as is described with respect to FIGS. 1, 3, and 5. The lens 824 may be the same as or similar to the lens 106. The lens may be a simple lens, an achromatic lens, an apochromatic lens, a superachromatic lens, or other type of lens. A filter 826, which may be the same as or similar to the linear filter 108 or the non-linear filter 504, is situated in between the sensor array 822 and the lens 824, such as is depicted in FIGS. 1, 3, 5, and 7.

A focus corrector 828 is situated between the imaging sensor array 822 and the lens 824, such as is depicted in FIGS. 1, 3, 5, and 7. The focus corrector 828 may be selected based upon the imaging system, such as the ability of the lens to correct for chromatic aberration, and the wavelengths of interest in the image data. The focus corrector may have one or more of the geometries such as is depicted in FIGS. 1, 3, 5, and 7, or may have some other geometry, such as one or more curved surfaces, and may also have one or more coatings applied thereto, such as antireflex coatings that may help to reduce loss of light and/or ghosting artifacts. The focus corrector 828 may be formed of any suitable optically transparent or translucent material, such as for example, glass, plastic, resin, polycarbonate, alloys, and so forth.

The firmware 820 is executable to accept instructions, such as from the imaging module 808, to capture images via the sensor array 822. The sensor array 822 is controllable, such as via the firmware 820, the turn on the sensor array 822 and activate the pixel sensors of the sensor array 822, and to receive electrical signals back from the sensor array 822, such as via electrical connections coupling the sensor array 822 and the processors 818. Such electrical signals indicate image data including pixel data. The firmware 820 may provide raw or processed image data 830 to the processor(s) 804, which may store the image data 830 in the memory 802.

The imaging module 808 is executable to further process the image data 830. In some embodiments, one or both of the firmware 820 or the imaging module 808 are executable to process the image data 830 in various ways, such as by correcting distortions in the image data 830 caused—for example—by the focus corrector 828. The imaging module 808 may be executable to perform other image processing functions such as image compression, image formatting, tone mapping to generate HDR images, a resolution enhancement algorithm to produce high-resolution images, orthorectification, and a stitching algorithm to generate images from multiple partially overlapping exposures, as well as other processing functions, such as blur removal, artifact removal, color enhancement, cropping, image conversion, image compression, data encryption, and so forth. The imaging system 800 is configured to provide image data, at various stages of processing, to another device, such as a ground-based device via a transmission media.

As noted above, the imaging device 810 may include one or more processors 818 and firmware 820 (stored on a suitable, non-transitory computer-readable storage medium) to perform or otherwise control various functions of the imaging device 810. The firmware 820 may be executable by the one or more processors 818 to control exposure times, time the exposure capture, store image data 830 on the memory 802, and so forth.

In embodiments, the firmware 820 of the imaging device 810 may be considered as an extension of one or both of the control module 806 and the imaging module 808, with some or all of the functions of the control module 806 and/or the imaging module 808 performed on or by the firmware 820, executing on the one or more processors 818. In some embodiments, some or all of the functions of the control module 806, the imaging module 808, and/or other functions of the firmware 820 may be implemented as logic functions on the one or more processors 818. For example, in some embodiments, the one or more processors 818 may include an application-specific integrated circuit (ASIC), a programmable logic device, such as a field programmable gate array (FPGA), or other logic circuit to perform various functions, including various control functions of the control module 806 and/or the image processing functions of the imaging module 808.

Computer-Readable Media

Depending on the configuration and type of computing device used, memory 802 of the imaging system 800 in FIG. 8 as well as the media for storing firmware 820 in the imaging device 810, may include volatile memory (such as random access memory (RAM)) and/or non-volatile memory (such as read-only memory (ROM), flash memory, etc.). Memory 802 as well as the media for storing firmware 820 in the imaging device 810, may also include additional removable storage and/or non-removable storage including, but not limited to, flash memory, magnetic storage and/or optical storage, and/or tape storage that may provide non-volatile storage of computer-readable instructions, data structures, program modules, and other data for imaging system 800.

Memory 802, as well as the media for storing firmware 820 in the imaging device 810, is an example of non-transitory computer-readable media. Non-transitory computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory (such as NAND flash memory such as may be included in one or more nonvolatile memory cards, and including flash with both single-level and multi-level cell technologies) or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

Example Operations for Imaging a Scene

Figure 9:
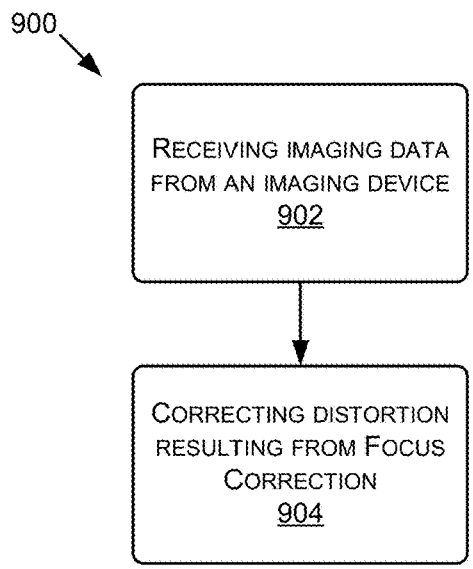
FIG. 9 is a flow diagram showing an example process for image processing in a system that includes a focus corrector.
Figure 10:
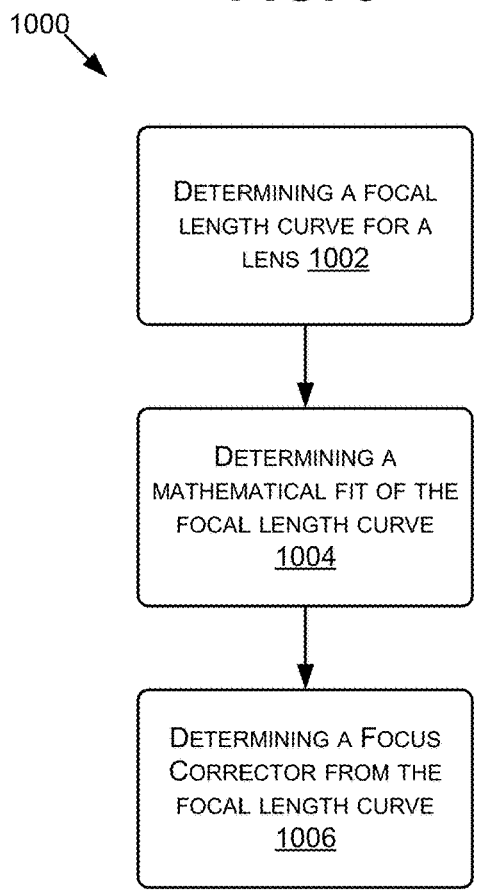
FIG. 10 is a flow diagram showing an example process for determining a focus corrector for a sensor array in an imaging device.

FIGS. 9 and 10 depict flow graphs that show example processes in accordance with various embodiments. The operations of these processes are illustrated as individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. In the context of hardware, the operations may be carried out in an integrated circuit, such as in an application specific integrated circuit (ASIC), in a programmable logic device, such as a field programmable gate array (FPGA), or other device. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph. Moreover, the operations may be carried out by a single system, such as onboard a spacecraft or aircraft, or may be shared between multiple systems located with the imaging system and one or more remote ground based systems.

FIG. 9 is a flow diagram showing an example process 900 for image processing in a system that includes a focus corrector. At 902, an imaging module, such as the imaging module 808, receives image data from an imaging device. The imaging data originates from a plurality of pixel sensors of a sensor array, where a plurality of pixel sensors of the sensor array are arranged in a planar area positioned in a generally perpendicular orientation with respect to an optical path of a lens of the imaging device. A focus corrector is disposed within the optical path between the lens and the sensor array and is designed to refract and cause the incoming light to converge at, or very near to, the sensor array. As a result of the refraction, a resulting image of the image data may have distortions. For example, some areas of the image may have different scaling factors caused by the transition of light to the material of the focus corrector. In other examples, the refractions may cause geometric distortions in the final image because the light is redirected through the focus corrector to arrive at the imaging sensor at a different location on the imaging sensor had the focus corrector not been introduced.

At 904, the imaging module performs image processing functions on the image data. The image processing functions include correcting a distortion in the image data resulting from the focus corrector. The imaging module may perform other image processing functions, such as image compression, image formatting, tone mapping to generate HDR images, a resolution enhancement algorithm to produce high-resolution images, and a stitching algorithm to generate images from multiple partially overlapping exposures, as well as other processing functions, such as blur removal, artifact removal, color enhancement, cropping, image conversion, image compression, data encryption, and so forth. The processing functions may occur at the imaging device, or alternatively, may occur at a remote processing station, such as a ground based station that receives the image data from the imaging device.

FIG. 10 is a flow diagram showing an example process 1000 for determining a focus corrector for an imaging device. At 1002, a focal length curve for a lens is determined. The focal length curve is determined, in various embodiments, by measuring the focal lengths of various wavelengths transmitted through the lens. A curve of focal lengths can be determined based, for example, on curve fitting, extrapolation, and so forth.

At 1004, a mathematical fit for the focal length curve is determined. The mathematical fit may be a linear fit, including a best linear fit, for a wavelength band (such as for a visible spectrum, a broad spectrum (including the visible spectrum, infrared, and ultraviolet spectrums), and so forth. In some instances, a mathematical fit of the focal length curve is nonlinear and may be dependent upon the geometry of the focus corrector. In many cases, a linear fit is determined due to the sensor array being arranged in a planar area. The linear fit reduces an overall measure of deviation between a linear focus position curve and the focal length curve, as shown in FIGS. 2B, 4, and 6B. A measure of deviation may include, for example, a sum of square errors calculation or similar. The linear fit may be a "best" fit in that it minimizes an overall measure of deviation between a linear focus position curve and the focal length curve.

At 1006, a focus corrector is based at least on the determined fit of the focus position curve to refract the wavelengths showing an unacceptable deviation from the focal length curve to cause a convergence of those wavelengths at or near the focus position curve. In other words, the focus corrector is designed such that certain wavelengths are refocused onto the sensor array.

Figure 11:
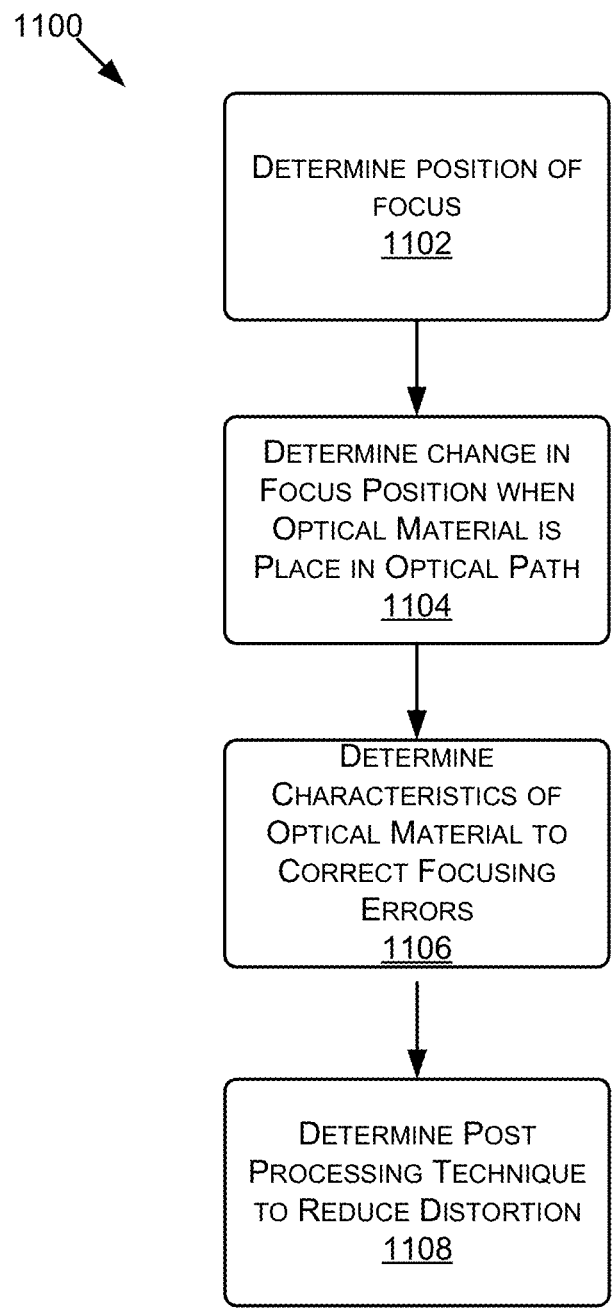
FIG. 11 is a flow diagram showing an example process for determining the focus corrector and processing images.

FIG. 11 is a flow diagram showing an example process 1100 for designing a focus corrector. At 1102, for a specified optical system, the position of focus along the optical axis vs the lateral displacement is measured and/or calculated. The result may be expressed mathematically and graphed to provide the focal length curve. A focal distance curve is compared to the focal length curve to determine deviations for specific wavelengths of interest.

At 1104, the change in focus position when an optical material of a known thickness is placed in the optical path is measured and/or calculated. The optical material will have a tendency to change the convergence point for specific wavelengths, which can be measured and compared to the focal distance curve to reduce the deviation for specific wavelengths of interest.

At 1106, the geometrical characteristics of the focus corrector are determined. That is, based upon the deviation between the focal length curve and the focus position curve, the focus corrector can be configured to provide focus correction on the desired wavelengths that show an unacceptable deviation from the focus position curve. In some embodiments, a lens may provide correction within the visible spectrum, and therefore, a focus corrector may be configured to only correct the focus for wavelengths outside the visible band, such as the infrared, near infrared, or ultraviolet spectrum. In this example, the focus corrector may resemble focus corrector 508 of FIG. 5 in which a portion of the focus corrector 508 corresponding to the already-corrected visible spectrum has a constant thickness, and a portion of the focus corrector 508 associated with the infrared spectrum is wedge-shaped, or prismatic, to provide correction to only specific wavelengths of the incoming light. The change in focus position can be measured and/or calculated based upon wedges of known angles and the desired optical material.

In other embodiments, the focus corrector may be stepped, such as the focus corrector 306 shown in FIG. 3. The desired thickness of each portion of the focus corrector 306 may be calculated and a scaling factor for each portion can be calculated and/or measured for later use in post processing.

At 1108, a post processing technique is determined to correct for the distortions introduced by the focus corrector. In some instances, an appropriate weight function can be applied to minimize, or at least reduce, the focus error. The parameters of the weight function can be varied until a minimum of the weight function is determined. Other post processing techniques include applying one or more scaling factors to portions of the image to account for inaccuracies in scaling. For example, for a stepped focus corrector, such as is illustrated in FIG. 3, light that passes through the various regions of the focus corrector having different thicknesses will result in portions of the resulting image that have different scaling factors due to the different thicknesses of the focus corrector. The image may be divided into sub-images that correspond with the different regions of the focus corrector, and a scaling factor may be applied to each sub-image before reassembling the final image.

Figure 12:
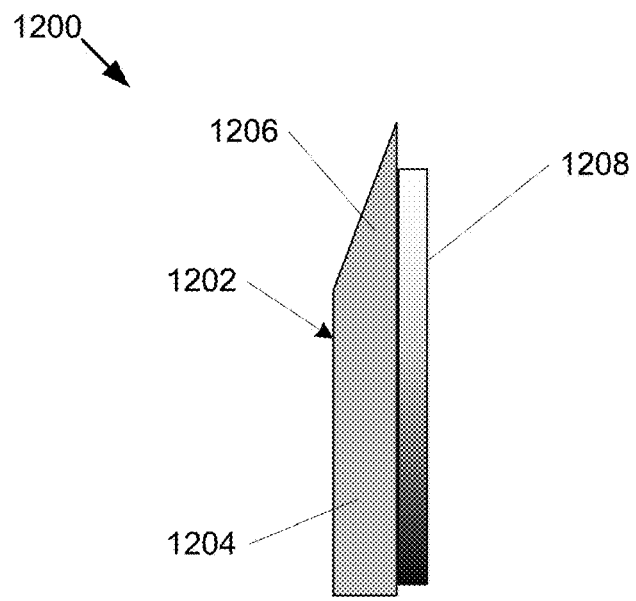
FIG. 12 illustrates a side view of a focus corrector used as a substrate for a deposited filter.

FIG. 12 is a side view illustrating a focus corrector assembly 1200 having an integral optical bandpass filter. The focus corrector 1202 may have a region of constant thickness 1204 and a prismatic region 1206. This arrangement may be used in embodiments in which an objective lens of the imaging device provides for correction of a portion of the spectrum, the prismatic region 1206 can be configured to correct the focus of wavelengths that are not accounted for by the lens.

The optical bandpass filter 1208 may be dichroic, and the dielectric films may be deposited on one or both faces of the focus corrector 1202 during manufacture. This may be done, for example, by vaporizing various materials and allowing the vapor to condense on the focus corrector 1202. The resulting deposited dielectric films may provide a linear or non-linear variable filter.

Figure 13:
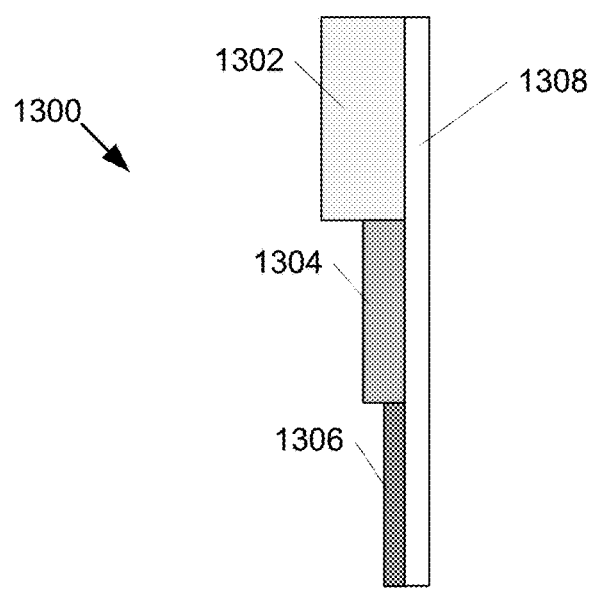
FIG. 13 illustrates a side view of colored filters attached to a common substrate.

FIG. 13 illustrates a side view of a focus corrector assembly 1300 in which colored filters 1302, 1304, 1306, are adhered to a common substrate 1308. As illustrated, colored filters 1302, 1304, 1306, may be formed of any suitable filter material, such as glass, resins, plastics, or any combination, may be formed to have a desired thickness and affixed to a substrate. In some instances, the substrate is an optically transparent material, such as glass, such that its effects on the resulting image are minimal.

The focus corrector assemblies illustrated in FIGS. 12 and 13 may be positioned in an optical pathway between the sensor array and the lens as shown in FIGS. 1, 3, and 5. Alternatively, the focus corrector assemblies may be positioned at a conjugate focal plane of the imaging system, where one is available. Moreover, while the focus corrector is shown being positioned in front of the optical bandpass filter, it should be appreciated that the optical bandpass filter could be placed in front of the focus corrector, such that the focus corrector is located between the optical bandpass filter and the sensor array. Other arrangements are contemplated herein, such as providing multiple optical bandpass filters, or forming an optical bandpass filter on multiple surfaces of the focus corrector, among others.

As a result of the disclosed embodiments, a commercial off the shelf (COTS) lens can be used for hyperspectral imaging, even where the lens is incapable on its own of correctly focusing every wavelength within a broad portion of the spectrum. There are many available COTS lenses that are relatively inexpensive and relatively light that can effectively be used for space-borne hyperspectral imaging without the need for expensive and heavy specially designed imaging systems.

CONCLUSION

Although the disclosure uses language that is specific to structural features and/or methodological acts, the disclosure is not limited to the specific features or acts described. Rather, the specific features and acts are disclosed as illustrative forms of implementing the disclosure.

What is claimed is:

1. An apparatus for multispectral imaging, comprising:
a lens;
an imaging device having a sensor array having a plurality of pixel sensors, the sensor array positioned to coincide with an optical axis of the lens;
a focus corrector disposed between the lens and the sensor array, the focus corrector having a first prismatic portion configured to refract desired wavelengths of light outside a given spectral range and cause the desired wavelengths to converge onto the sensor array; and
an optical bandpass filter disposed between the sensor array and the focus corrector, the optical bandpass filter configured to selectively allow transmission of desired wavelengths therethrough.

2. The apparatus of claim 1, wherein ones of the plurality of pixel sensors are configured to detect corresponding ones of a plurality of wavelengths, and wherein the focus corrector is configured such that a measure of corresponding focal lengths of the lens for the ones of the plurality of wavelengths of the ones of the plurality of pixel sensors are within a threshold focus error tolerance.

3. The apparatus of claim 1, wherein the focus corrector comprises a constant-thickness portion, the constant-thickness portion designed to allow light in a given spectral band to pass therethrough.

4. The apparatus of claim 1, where in the focus corrector comprises a continuously variable thickness portion designed to allow light in a given spectral band to pass therethrough.

5. The apparatus of claim 1, where the focus corrector comprises a variable thickness portion that varies in accordance to a wavelength-dependent focal variation of the lens.

6. The apparatus of claim 1, wherein the optical bandpass filter is a linear variable filter.

7. The apparatus of claim 1, wherein the optical bandpass filter comprises two or more discrete spectral bands.

8. The apparatus of claim 1, wherein ones of the plurality of pixel sensors are configured to detect corresponding ones of a plurality of wavelengths, and the focus corrector flattens a curve of corresponding focal lengths of the lens for the ones of the plurality of wavelengths of the ones of the plurality of pixel sensors.

9. The apparatus of claim 1, wherein the lens is one of a simple lens, an achromatic lens, an apochromatic lens, or a superachromatic lens.

10. A satellite imaging system, comprising:
a lens having a plurality of focal lengths for each of a plurality of wavelengths, the plurality of focal lengths described by a focal length curve of the plurality of wavelengths;
an array of pixel sensors, the array of pixel sensors arranged in a planar area perpendicular to an optical axis of the lens, a plurality of portions of the planar area designating for sensing corresponding ones of the plurality of wavelengths;
a focus corrector disposed between the lens and the array of pixel sensors, the focus corrector configured to refract the plurality of wavelengths such that the plurality of wavelengths substantially converge on the array of pixel sensors; and
an optical bandpass filter disposed between the lens and the array of pixel sensors.

11. The satellite imaging system of claim 10, wherein the corresponding ones of the plurality of wavelengths that the plurality of portions of the planar area are designated for detecting is a function of distances that individual ones of the plurality of portions are from a first edge of the array of pixel sensors.

12. The satellite imaging system of claim 10, wherein the plurality of portions of the planar area are designated for detecting corresponding ones of the plurality of wavelengths based at least on a variable filter situated between the lens and the array of pixel sensors.

13. The satellite imaging system of claim 10, wherein the focus corrector is configured to reduce an overall measure of deviation between the focal length curve of the plurality of wavelengths and a focus position curve.

14. The satellite imaging system of claim 10, further comprising an image processor configured to obtain image data from the array of pixel sensors, and correct distortions caused by the focus corrector.

15. The satellite imaging system of claim 14, wherein the image processor is configured to correct geometric distortions in the image data.

16. The satellite imaging system of claim 10, wherein the optical bandpass filter is deposited on, or adhered to, the focus corrector.

17. The satellite imaging system of claim 10, wherein the focus corrector is located at a conjugate focal plane of the lens.

18. A method for multispectral imaging, the method comprising:

receiving image data from an imaging device, the image data originating from a plurality of pixel sensors of an array, the imaging device having a focus corrector configured to correct a focus of an image produced from the image data, the focus corrector further configured to correct the focus of the image associated with at least a portion of a spectrum of light; and correcting a distortion in the image data, the distortion resulting from the focus corrector;

wherein the plurality of pixel sensors are arranged in a planar area, and wherein a plurality of portions of the planar area are for sensing corresponding ones of a plurality of wavelengths based at least on a variable filter situated between a lens and the plurality of pixel sensors.

19. The method of claim 18, wherein the focus corrector causes a reduction in an overall measure of deviation between corresponding focal lengths of the lens for ones of the plurality of wavelengths and a focal plane of the planar area.

* * * * *